(12) United States Patent
Sogen et al.

(10) Patent No.: US 10,539,962 B2
(45) Date of Patent: Jan. 21, 2020

(54) INFORMATION PROCESSING APPARATUS AND INFORMATION PROCESSING METHOD

(71) Applicant: Toyota Jidosha Kabushiki Kaisha, Toyota-shi, Aichi-ken (JP)

(72) Inventors: Kiyohiro Sogen, Shizuoka-ken (JP); Hiroyuki Aono, Susono (JP); Yoshihiro Ohe, Kawasaki (JP); Akiomi Kunisa, Hirakata (JP); Junichi Meguro, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 104 days.

(21) Appl. No.: 15/676,363

(22) Filed: Aug. 14, 2017

(65) Prior Publication Data

US 2018/0059671 A1 Mar. 1, 2018

(30) Foreign Application Priority Data

Aug. 26, 2016 (JP) .................. 2016-166055

(51) Int. Cl.
*G05D 1/02* (2006.01)
*G01C 21/34* (2006.01)
(Continued)

(52) U.S. Cl.
CPC ....... *G05D 1/0214* (2013.01); *G01C 21/3461* (2013.01); *G01C 21/3667* (2013.01); *G01C 21/3691* (2013.01); *G05D 1/0011* (2013.01); *G05D 1/0223* (2013.01); *G05D 1/0287* (2013.01)

(58) Field of Classification Search
CPC .... G05D 1/0214; B60W 30/12; B60W 30/16; B60W 30/18154; B60W 30/18172
See application file for complete search history.

(56) References Cited

U.S. PATENT DOCUMENTS 8,509,982 B2   8/2013  Montemerlo et al.
9,079,587 B1   7/2015  Rupp et al.
(Continued)

FOREIGN PATENT DOCUMENTS

DE   102005057251 A1   6/2007
DE   102008042999 A1   4/2010
(Continued)

*Primary Examiner* — Michael D Lang
(74) *Attorney, Agent, or Firm* — Dinsmore & Shohl LLP

(57) ABSTRACT

An information processing apparatus capable of communicating with a vehicle includes a storage unit configured to store a location of an autonomous driving prohibition section on a map in association with a release condition set based on a traveling state of the vehicle; and a control unit configured to acquire the traveling state of the vehicle including the location of the vehicle on the map from the vehicle through communication, the control unit being configured to determine whether or not to release the autonomous driving prohibition section based on the acquired traveling state of the vehicle, the location of the autonomous driving prohibition section and the release condition of the autonomous driving prohibition section, the location and release condition being stored in the storage unit.

14 Claims, 10 Drawing Sheets

(51) Int. Cl.
*G01C 21/36* (2006.01)
*G05D 1/00* (2006.01)

(56) References Cited

U.S. PATENT DOCUMENTS

| | | |
|---|---|---|
| 2015/0187218 A1 | 7/2015 | Harasaki |
| 2015/0241878 A1 | 8/2015 | Crombez et al. |
| 2016/0214612 A1 | 7/2016 | Kashiba et al. |
| 2017/0203770 A1 | 7/2017 | Kondo |
| 2018/0012493 A1* | 1/2018 | Harda .................... G01C 21/28 |

FOREIGN PATENT DOCUMENTS

| | | |
|---|---|---|
| DE | 102011082375 A1 | 3/2013 |
| DE | 102015203155 A1 | 8/2015 |
| EP | 2915718 A1 | 9/2015 |
| JP | 4913880 B2 | 4/2012 |
| JP | 2015-206655 A | 11/2015 |
| JP | 2016-028927 A | 3/2016 |
| JP | 2016-085525 A | 5/2016 |
| WO | 2013/034347 A2 | 3/2013 |

* cited by examiner

FIG. 3

| LOCATION OF AUTONOMOUS DRIVING PROHIBITION SECTION | SETTING REASON | RELEASE CONDITION |
|---|---|---|
| SECTION A1 | HEAVY RAIN | RELEASE CONDITION K2 |
| SECTION A5 | OBSTACLE | RELEASE CONDITION K1 |
| SECTION B3 | MERGING IMPOSSIBLE | RELEASE CONDITION K4 |
| SECTION B7 | OCCURRENCE OF SLIP | RELEASE CONDITION K3 |
| SECTION C11 | OBSTACLE | RELEASE CONDITION K1 |
| ... | ... | ... |

33A

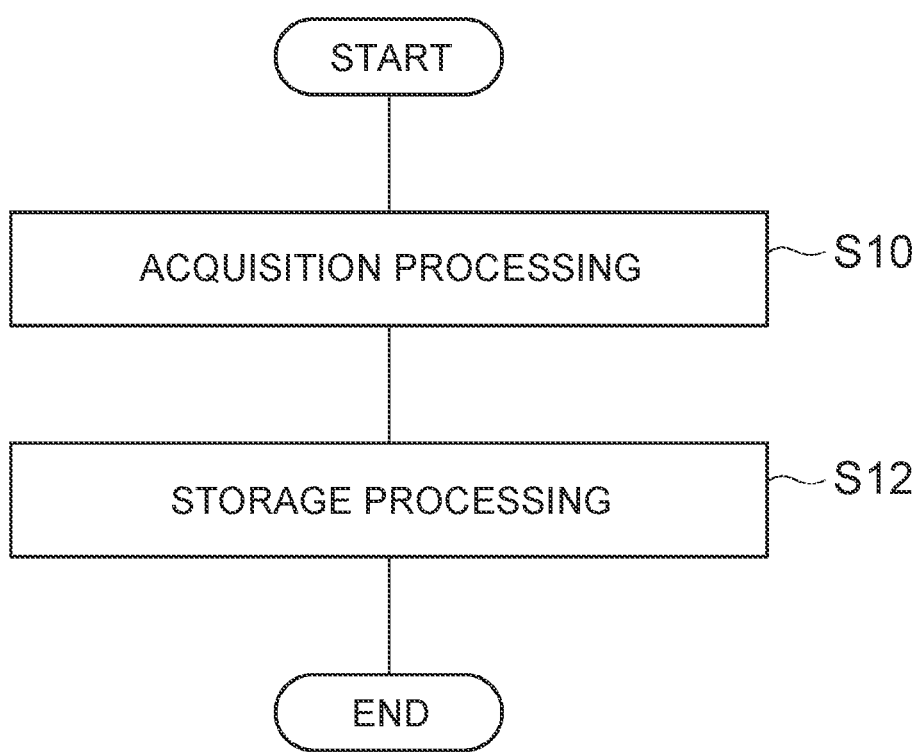

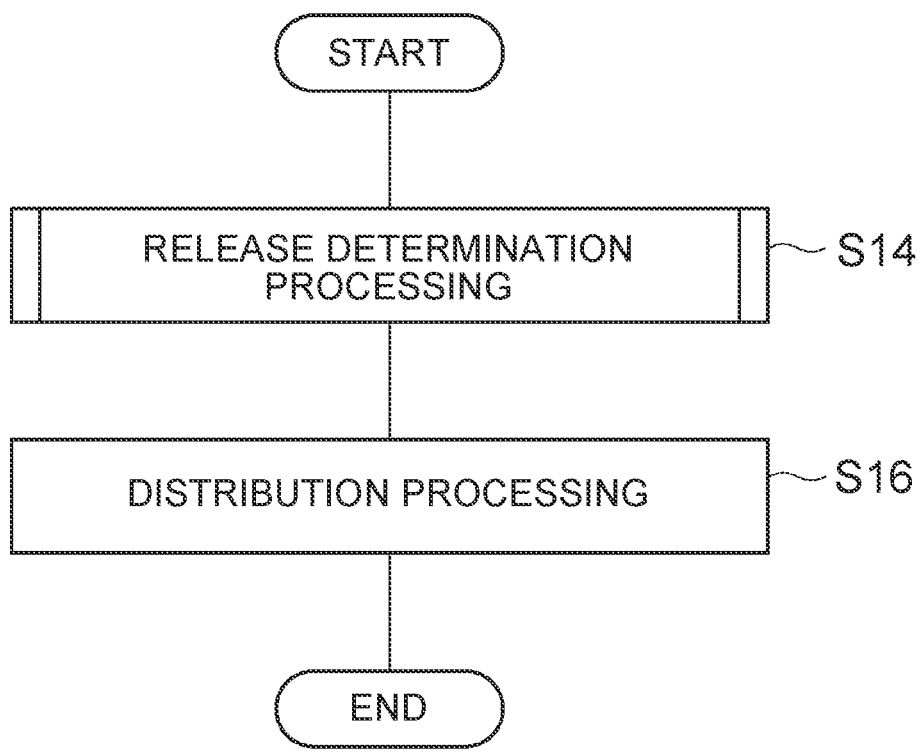

INFORMATION PROCESSING APPARATUS AND INFORMATION PROCESSING METHOD

CROSS-REFERENCE TO RELATED APPLICATIONS

This application claims priority to Japanese Patent Application No. 2016-166055 filed on Aug. 26, 2016, which is incorporated herein by reference in its entirety including the specification, drawings and abstract.

BACKGROUND

1. Technical Field

The present disclosure relates to an information processing apparatus and an information processing method.

2. Description of Related Art

U.S. Pat. No. 8,509,982 discloses a vehicle capable of communication. The vehicle informs a driver that the vehicle is approaching an area where autonomous driving is hard with reference to a map that stores areas where autonomous driving is hard. The areas where autonomous driving is hard include sections where autonomous driving is difficult in which autonomous driving can be continued at lowered speeds and autonomous driving prohibition sections where autonomous driving is prohibited. The areas where autonomous driving is hard may also be set by drivers. For example, when a driver notices temporary construction, the driver sets the site of the temporary construction as an area where autonomous driving is hard. The driver can set a validity term (data maintain period) for the area where autonomous driving is hard set by his or herself. The information on the area where autonomous driving is hard is shared with other vehicles through a network.

SUMMARY

The vehicle disclosed in U.S. Pat. No. 8,509,982 and other vehicles release the autonomous driving prohibition sections based on the validity terms set by specific drivers. However, the autonomous driving prohibition sections may be set not only because autonomous driving is hindered by temporary construction, but also because of bad weather or because of frequent failure in merging in autonomous driving. When the autonomous driving prohibition sections are set because of these reasons, it is hard to set validity terms for these sections. It is therefore not appropriate to determine release of the autonomous driving prohibition sections based only on the validity terms. In this technology field, there is a demand for an information processing apparatus which can release the autonomous driving prohibition sections when the reasons for setting the autonomous driving prohibition sections are eliminated.

An information processing apparatus according to a first aspect of the present disclosure is an information processing apparatus capable of communicating with a vehicle, including: a storage unit configured to store a location of an autonomous driving prohibition section on a map in association with a release condition set based on a traveling state of the vehicle; and a control unit configured to acquire the traveling state of the vehicle including the location of the vehicle on the map from the vehicle through communication, the control unit being configured to determine whether or not to release the autonomous driving prohibition section based on the acquired traveling state of the vehicle, the location of the autonomous driving prohibition section and the release condition of the autonomous driving prohibition section, the location and the release condition being stored in the storage unit.

In the information processing apparatus, the storage unit stores the location of the autonomous driving prohibition section on the map in association with the release condition. The control unit determines whether or not to release the autonomous driving prohibition section based on the traveling state of the vehicle and on the location and the release condition of the autonomous driving prohibition section. Thus, the information processing apparatus can determine elimination of the reason that the autonomous driving prohibition section is set using the release condition set for every autonomous driving prohibition section based on the traveling state of the vehicle. Accordingly, the information processing apparatus can release the autonomous driving prohibition section, when the reason that the autonomous driving prohibition section is set is eliminated.

In the first aspect of the present disclosure, the storage unit may be configured to store a location of a first autonomous driving prohibition section that is the autonomous driving prohibition section on the map in association with a first release condition as the release condition where the number of the vehicles passing through the first autonomous driving prohibition section becomes a specified number or more, and the control unit may be configured to determine release of the first autonomous driving prohibition section when the number of vehicles passing through the first autonomous driving prohibition section is the specified number or more. The first autonomous driving prohibition section may be set as the autonomous driving prohibition section due to existence of an obstacle. In this case, the information processing apparatus can determine elimination of the reason that the first autonomous driving prohibition section is set, based on the number of the passing vehicles.

In the first aspect of the present disclosure, the storage unit may be configured to store a location of a second autonomous driving prohibition section that is the autonomous driving prohibition section on the map in association with a second release condition as the release condition where the vehicle passes through the second autonomous driving prohibition section without activation of onboard equipment, and the control unit may be configured to acquire operating information on the onboard equipment from the vehicle as the traveling state, and determine release of the second autonomous driving prohibition section when the vehicle passes through the second autonomous driving prohibition section without activation of onboard equipment.

The second autonomous driving prohibition section may be a section set as the autonomous driving prohibition section due to rainy weather. The onboard equipment may be a wiper. In this case, the information processing apparatus can determine elimination of the reason that the second autonomous driving prohibition section is set, based on the operating information on the onboard equipment such as a wiper and a defroster.

In the first aspect of the present disclosure, the storage unit may be configured to store a location of a third autonomous driving prohibition section that is the autonomous driving prohibition section on the map in association with a third release condition as the release condition where the vehicle passes through the third autonomous driving prohibition section without activation of a travel system, and the control unit may be configured to acquire operating information on the travel system from the vehicle as the traveling state and determine release of the third autonomous driving prohibition section when the vehicle passes through the third autonomous driving prohibition section without activation of the travel system.

The third autonomous driving prohibition section may be a section set as the autonomous driving prohibition section due to the section being a low friction road. The travel system may be a system for slip prevention. In this case, the information processing apparatus can determine elimination of the reason that the third autonomous driving prohibition section is set, based on the operating information on the travel system such as a slip prevention system.

In the first aspect of the present disclosure, the storage unit may be configured to store a location of a fourth autonomous driving prohibition section that is the autonomous driving prohibition section on the map in association with a fourth release condition as the release condition where a difference between speed of the vehicle traveling in a merging destination section connected to the fourth autonomous driving prohibition section and a speed limit of the merging destination section is less than a prescribed speed, and the control unit may be configured to determine release of the fourth autonomous driving prohibition section when the difference between the speed of the vehicle traveling in the merging destination section and the speed limit of the merging destination section is less than the prescribed speed.

The fourth autonomous driving prohibition section may be a section having a merging point ahead of the section. In this case, the information processing apparatus can determine elimination of the reason that the fourth autonomous driving prohibition section is set, based on the difference between the speed of the vehicle traveling in the merging destination section and the speed limit of the merging destination section.

An information processing method according to a second aspect of the present disclosure includes: storing in a storage unit a location of an autonomous driving prohibition section on a map in association with a release condition set based on a traveling state of a vehicle; acquiring the traveling state of the vehicle including the location of the vehicle on the map through communication from the vehicle by a control unit; and determining whether or not to release the autonomous driving prohibition section based on the acquired traveling state of the vehicle, the location of the autonomous driving prohibition section and the release condition of the autonomous driving prohibition section, the location and the release condition being stored in a storage unit.

In the second aspect of the present disclosure, the autonomous driving section may be a first autonomous driving prohibition section set as the autonomous driving prohibition section due to existence of an obstacle, the release condition may be a first release condition where the number of vehicles passing through the first autonomous driving prohibition section becomes a specified number or more, and the first autonomous driving prohibition section may be determined to be released by the control unit when the number of the vehicles passing through the first autonomous driving prohibition section is the specified number or more.

In the second aspect of the present disclosure, the autonomous driving section may be a section set as the autonomous driving prohibition section due to rainy weather, the release condition may be a second release condition where the vehicle passes through the second autonomous driving prohibition section without activation of onboard equipment, and operating information on the onboard equipment as the traveling state may be acquired from the vehicle by the control unit, and the second autonomous driving prohibition section may be determined to be released by the contrail unit when the vehicle passes through the second autonomous driving prohibition section without activation of the onboard equipment.

In the second aspect of the present disclosure, the autonomous driving section may be a section set as the autonomous driving prohibition section due to the section being a low friction road section, the release condition may be a third release condition where the vehicle passes through the third autonomous driving prohibition section without activation of a travel system, and operating information on the travel system may be acquired from the vehicle by the control unit as the traveling state, and the third autonomous driving prohibition section may be determined to be released by the control unit when the vehicle passes through the third autonomous driving prohibition section without activation of the travel system.

In the second aspect of the present disclosure, the autonomous driving prohibition section may be a fourth autonomous driving prohibition section being a section having a merging point ahead of the section, the release condition may be a fourth release condition where a difference between speed of the vehicle traveling in a merging destination section connected to the fourth autonomous driving prohibition section and a speed limit of the merging destination section is less than a prescribed speed, and the fourth autonomous driving prohibition section may be determined to release by the control unit when the difference between the speed of the vehicle traveling in the merging destination section and the speed limit of the merging destination section is less than the prescribed speed.

According to various aspects of the present disclosure, it is possible to release the autonomous driving prohibition section when the reason that the autonomous driving prohibition section is set is eliminated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is one example of a release table;

FIG. 5 is a flowchart of acquisition processing;

FIG. 6 is a flowchart of release determination processing;

DETAILED DESCRIPTION OF EMBODIMENTS

Figure 1:
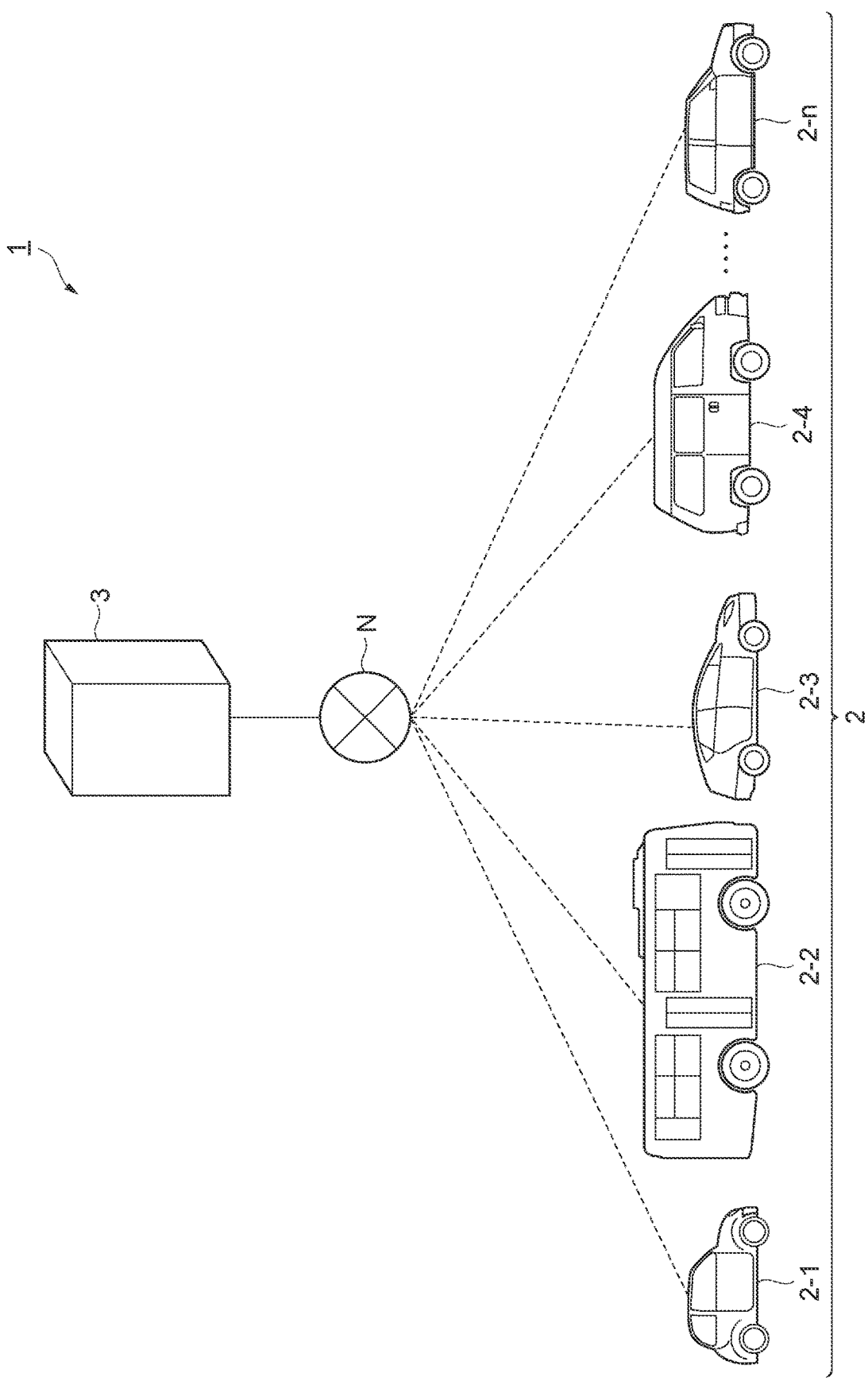
FIG. 1 is an explanatory view of a vehicle communication system.

Hereinbelow, the present embodiment will be described with reference to the accompanying drawings. In the description below, like or corresponding component members are designated by like reference numerals to omit redundant explanation.

[Outline of Vehicle Communication System]

FIG. 1 is an explanatory view of a vehicle communication system. As illustrated in FIG. 1, the vehicle communication system 1 includes a plurality of vehicles 2 and a server 3.

The plurality of vehicles 2 include a vehicle 2-1 to vehicle 2-n. The value n is a natural number larger than one. The vehicle 2-1 to vehicle 2-n are vehicles including a two-way communication function. The vehicle 2 includes well-known component members, such as a speed sensor, necessary for traveling. The vehicle 2 travels on a road by activating an actuator and the like by driving operation of a driver or by an autonomous driving function. The vehicle 2-1 to vehicle 2-n are configured to be able to communicate with the server 3 through a network N. For example, the network N is the Internet or a privately leased line.

The server 3 acquires information from the plurality of vehicles 2 through the network N. The server 3 acquires and collects information such as a location, a speed, sensor information, operating information on a travel system or onboard equipment, and a recognition status of an autonomous driving system from the plurality of vehicles 2. The server 3 also acquires information such as traffic congestion information, obstacle information, and service area information from other servers and the like, and distributes the acquired information to the plurality of vehicles 2. The server 3 can also distribute information in response to requests from the plurality of vehicles 2. Thus, the plurality of vehicles 2 can share the information through the server 3.

The information that the plurality of vehicles 2 should share includes autonomous driving prohibition sections where autonomous driving is prohibited. The autonomous driving prohibition sections are sections set on a map. The sections are set based on the information (information reported from the plurality of vehicles 2) acquired from the plurality of vehicles 2. The autonomous driving prohibition sections are set upon occurrence of phenomena where autonomous driving should not be performed or phenomena where autonomous driving cannot be performed. Who sets the autonomous driving prohibition section is not limited. That is, the autonomous driving prohibition sections may be set by the server 3, the vehicles 2, or by other servers.

The server 3 stores locations of the autonomous driving prohibition sections on the map. The server 3 can distribute the locations of the autonomous driving prohibition sections to the plurality of vehicles 2. Accordingly, the information on the autonomous driving prohibition sections is shared by the plurality of vehicles 2. When the vehicles 2 are autonomous driving vehicles, the vehicles 2 may be controlled to prevent the vehicles 2 from traveling by autonomous driving in the autonomous driving prohibition sections. In this case, the vehicles 2 travel by manual driving performed by the drivers of the vehicles 2.

The autonomous driving prohibition sections impose a large restriction that prohibits the autonomous driving vehicles from performing autonomous driving. Accordingly, when a phenomenon where autonomous driving should not be performed or a phenomenon where autonomous driving cannot be performed is eliminated, it is necessary to swiftly release the autonomous driving prohibition section. The server 3 determines elimination of the phenomenon where autonomous driving should not be performed or the phenomenon where autonomous driving cannot be performed, and releases the autonomous driving prohibition section as described later. The server 3 can distribute the release of the autonomous driving prohibition section to the plurality of vehicles 2. Accordingly, the plurality of vehicles 2 can share the release of the autonomous driving prohibition section, which enables the vehicles 2 to travel by autonomous driving in the section released from autonomous driving prohibition.

[Detailed Configuration of Vehicle Communication System]

[Vehicle]

Figure 2:
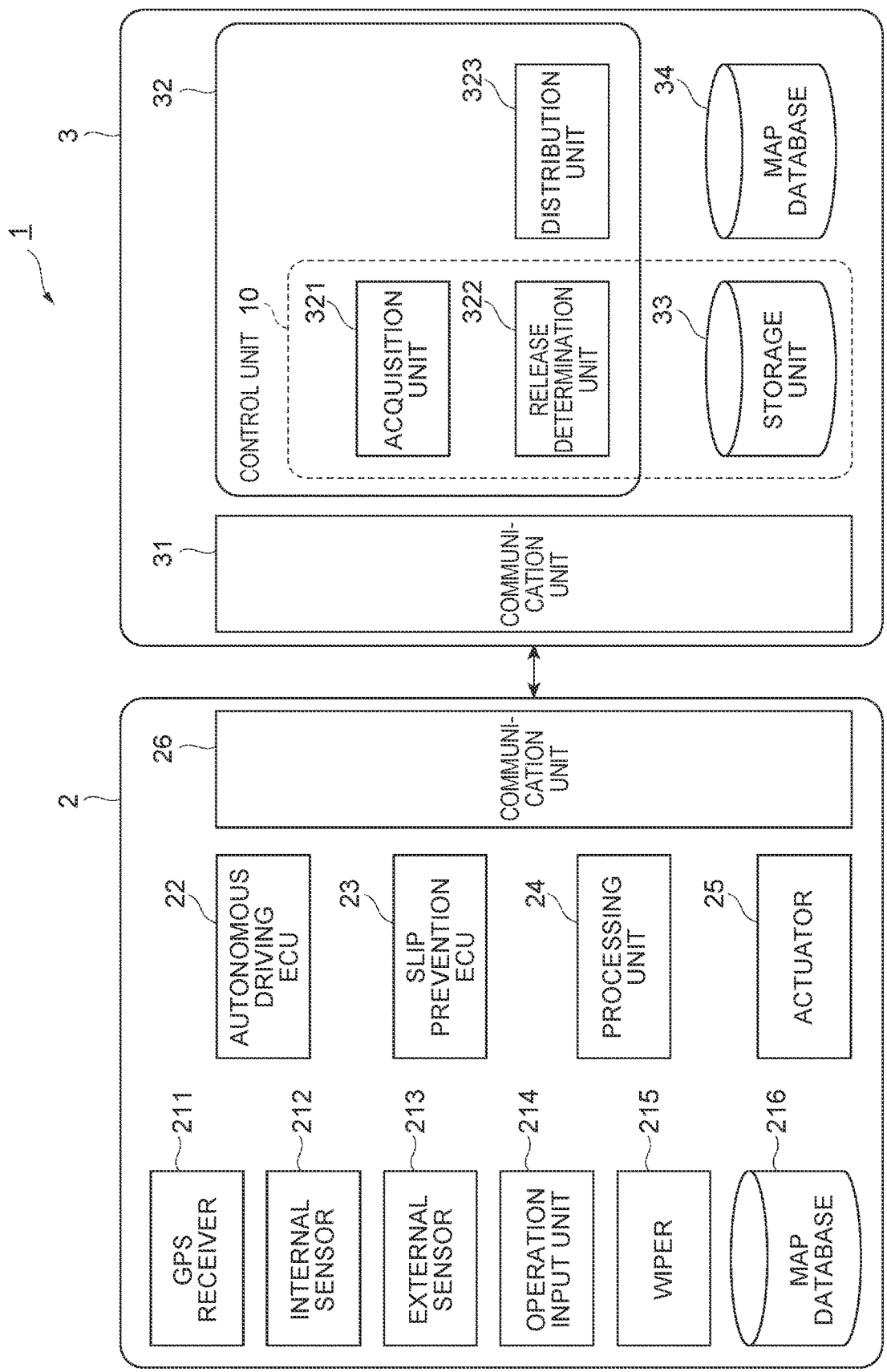
FIG. 2 is a block diagram illustrating the configuration of the vehicle communication system.

FIG. 2 is a block diagram describing the configuration of the vehicle communication system 1. As illustrated in FIG. 2, one example of the vehicle 2 includes a global positioning system (GPS) receiver 211, an internal sensor 212, an external sensor 213, an operation input unit 214, a wiper (one example of onboard equipment) 215, a map database 216, an autonomous driving electronic control unit (ECU) 22, a slip prevention ECU (one example of travel system) 23, a processing unit 24, an actuator 25, and a communication unit 26.

The GPS receiver 211 is a device that receives GPS signals. The GPS receiver 211 receives signals from three or more GPS Satellites to measure the location of the vehicle 2 (one example of the traveling state). For example, the location of the vehicle 2 is expressed as location information, such as a latitude and a longitude. The GPS receiver 211 transmits the measured location information on the vehicle 2 to the autonomous driving ECU 22 and the processing unit 24.

The internal sensor 212 is a detection device that detects the motion state (one example of the traveling state) of the vehicle 2. One example of the internal sensor 212 includes a vehicle speed sensor, an acceleration sensor, and a yaw rate sensor. The vehicle speed sensor is a detector that detects the speed of the vehicle 2. One example of the vehicle speed sensor is a wheel speed sensor. The acceleration sensor is a detector that detects acceleration of the vehicle 2. One example of the acceleration sensor is a sensor that uses a weight supported by a spring to detect acceleration from a displacement amount of the spring. The yaw rate sensor is a detector that detects the yaw rate of the vehicle 2. One example of the yaw rate sensor is a gyro sensor. The internal sensor 212 transmits the motion state of the vehicle 2 to the autonomous driving ECU 22, the slip prevention ECU 23, and the processing unit 24.

The external sensor 213 is a detector that detects circumstances around the vehicle 2. One example of the external sensor 213 includes a camera, a radar, and a laser imaging detection and ranging (LIDAR). The camera is an imaging device that images external circumstances of the vehicle 2. The radar is a detector that detects an obstacle outside the vehicle 2 using electric waves (such as millimeter waves). The LIDAR is a detector that detects an obstacle outside the vehicle 2 using light. The external sensor 213 transmits the circumstances around the vehicle 2 to the autonomous driving ECU 22 and the processing unit 24.

The operation input unit 214 is a device that receives operation by the driver. One example of the operation input unit 214 is a steering wheel used for manual driving. The operation input unit 214 transmits a signal corresponding to the driving operation to the actuator 25.

The wiper 215 is a mechanism that wipes waterdrops off a windshield glass or a rear glass of the vehicle 2. The wiper 215 is activated when a waterdrop sensor senses waterdrops. The wiper 215 can also be operated or activated based on operation of the driver. The wiper 215 outputs operating information (one example of the traveling state) to the processing unit 24.

The map database 216 is a database that stores map information. The map information is the data with which a map can be created. The map information includes information such as location information on roads, information on road geometries (such as types of curves and straight roads, and curvature of the curves), width information on the roads, height information on the roads, location information on junctions and branch points, and location information on buildings. The map database 216 may be synchronized with a later-described map database 34 of the server 3 at specified intervals.

The autonomous driving ECU 22 is an electronic control unit having an arithmetic unit such as a central processing unit (CPU), a storage device such as a read only memory (ROM) and a random access memory (RAM), a controller area network (CAN) communication circuit, and the like. The autonomous driving ECU 22 has later-described functions implemented when the CPU of the autonomous driving ECU 22 loads and executes programs stored in the storage device.

The autonomous driving ECU 22 is mounted on the vehicle 2 to execute autonomous driving of the vehicle 2. The autonomous driving is vehicle control to cause autonomous traveling of the vehicle without driving operation of the driver. Society of Automotive Engineers (SAE) J3016 prescribes levels of driving automation in accordance with the degree of autonomous driving.

The autonomous driving ECU 22 generates a travel plan along a target route preset based on the location information on the vehicle 2 in the GPS receiver 211, the map information in the map database 216, and the detection results of the internal sensor 212 and the external sensor 213. The target route is set by the driver or a publicly known navigation system. The autonomous driving ECU 22 executes autonomous driving according to the travel plan. The autonomous driving ECU 22 transmits a control signal to the actuator of the vehicle 2 to execute autonomous driving in accordance with the travel plan. The autonomous driving ECU 22 generates the travel plan with a well-known technique and also executes autonomous driving.

The autonomous driving ECU 22 may calculate the reliability of the system while executing autonomous driving. The reliability of the system is a criterion of the certainty of determination or performance in autonomous driving. The system reliability includes the reliability of recognition, the reliability of vehicle location, the reliability of the travel plan and the like. The reliability of recognition is dependent on the performance of the internal sensor 212 and the external sensor 213 and is also dependent on a traveling environment. For example, the reliability of recognition is calculated to be higher as the number of obstacles recognized in the external circumstances is lower. The reliability of recognition is calculated to be higher as the weather is better. The reliability of the vehicle location is dependent on the performance of the GPS and is also dependent on the traveling environment. For example, the reliability of the vehicle location is calculated to be higher at the location where no building is located in the vicinity of the vehicle 2, compared with the location where some building is located. The reliability of the travel plan can be evaluated based on similarity between a path plan of the vehicle traveling in the travel plan and a track of the vehicle traveling at the center of a lane. For example, the reliability of the travel plan is calculated to be higher when the path plan is closer to the track of the vehicle traveling at the center of a lane than to the track of avoiding an obstacle. The autonomous driving ECU 22 transmits the system reliability to the processing unit 24.

The autonomous driving ECU 22 transmits an autonomous driving end signal to the processing unit 24, when a preset termination condition of autonomous driving is satisfied. When receiving a manual driving shift signal, the autonomous driving ECU 22 ends the autonomous driving and shifts the vehicle 2 to manual driving. The manual driving is a driver-oriented driving mode in which the vehicle travels based on driving operation by the driver. When the vehicle arrives at an autonomous driving prohibition section, the autonomous driving ECU 22 determines that the termination condition of autonomous driving is satisfied, and transmits the autonomous driving end signal to the processing unit 24.

The slip prevention ECU 23 is an electronic control unit having an arithmetic unit such as a CPU, a storage device such as a ROM and a RAM, a CAN communication circuit, and the like. The slip prevention ECU 23 has later-described functions implemented when the CPU of the slip prevention ECU 23 loads and executes programs stored in the storage device.

The slip prevention ECU 23 senses lock and slip of the wheels of the vehicle 2 based on the detection result of the internal sensor 212, and controls each of the wheels to maintain the stability of the vehicle 2. For example, the slip prevention ECU 23 controls the brake oil pressure of all the four wheels based on the detection result of the wheel speed sensor during braking so as to prevent the wheels from being locked.

The processing unit 24 is a control device that is an electronic control unit having an arithmetic unit such as a CPU, a storage device such as a ROM and a RAM, a CAN communication circuit, and the like. The processing unit 24 determines the content transmitted to and received from the server 3. The processing unit 24 transmits to the server 3 through the communication unit 26 the location of the vehicle 2 on the map obtained using the location information acquired from the GPS receiver 211 and the map in the map database 216, as well as some of or all of the information output from the internal sensor 212, the external sensor 213, the wiper 215, the autonomous driving ECU 22, and the slip prevention ECU 23. The communication unit 26 is a communication device in conformity with communications protocols of the network N. The processing unit 24 also outputs a request signal to request information to the server 3 through the communication unit 26, and acquires the information from the server 3.

The actuator 25 is a device that executes traveling control of the vehicle 2. The actuator 25 includes at least well-known engine actuator, brake actuator, and steering actuator. The actuator 25 operates in response to a driving operation signal from the operation input unit 214, a control signal from the autonomous driving ECU 22, or a control signal from the slip prevention ECU 23.

[Server]

The server 3 can communicate with the vehicles 2. In one example, the server 3 includes a communication unit 31, a control unit 32, a storage unit 33, and a map database 34.

The communication unit 31 is a communication device in conformity with the communications protocols of the network N. The control unit 32 is an arithmetic unit such as a CPU. Functionally, the control unit 32 includes an acquisition unit 321, a release determination unit 322, and a distribution unit 323. The information processing apparatus 10, which includes the acquisition unit 321, the release determination unit 322, and the storage unit 33, can communicate with the vehicle 2. The control unit 32 does not need to include the distribution unit 323.

The acquisition unit 321 acquires the traveling state of the vehicle 2 from the vehicle 2 through communication. The acquisition unit 321 acquires the traveling state from the vehicle 2 through the network N and the communication unit 31. The traveling state, which is the information indicative of the circumstances during traveling of the vehicle 2, includes at least the location of the vehicle 2 on the map. The location of the vehicle 2 on the map is a location of the vehicle 2 on the map in the map database 216. The traveling state may include the motion state of the vehicle 2, the operating information on the onboard equipment, or the operating information on the travel system. The motion state of the vehicle 2 is the information acquired by the internal sensor 212 of the vehicle 2. The motion state of the vehicle 2 includes speed, for example. The onboard equipment of the vehicle 2 is the wiper 215, for example. The travel system of the vehicle 2 is the slip prevention ECU 23, for example. The acquisition unit 321 accumulates the acquired traveling state in the storage unit 33. For example, the acquisition unit 321 may store the traveling state of the vehicle 2 in association with acquisition time, or may store the traveling state of the vehicle 2 in association with acquisition time for every section (location).

The storage unit 33 stores the location of an autonomous driving prohibition section on the map in association with a release condition thereof set with the traveling state of the vehicle. The location of the autonomous driving prohibition section on the map is a location on the map in the later-described map database 34. The release condition is a requirement provided in order to release the autonomous driving prohibition section. The release condition is set for every autonomous driving prohibition section. When the release condition is satisfied, the autonomous driving prohibition section is released. The release condition is set based on the traveling state of the vehicle 2. The term "release" signifies changing the autonomous driving prohibition section to an autonomous driving permission section. How to release the autonomous driving prohibition section is not particularly specified. For example, the autonomous driving prohibition section can be released by deleting a flag indicative of the autonomous driving prohibition section or by deleting pertinent data from a table that stores the autonomous driving prohibition sections. The phrase "the location of the autonomous driving prohibition section on the map is stored in association with the release condition" signifies that the location and the release condition of the autonomous driving prohibition section are stored in the storage unit 33 in a linked state so that the release condition can be acquired based the location (traveling section).

FIG. 3 is one example of a release table stored in the storage unit 33. The release table 33A is a table that associates the locations of the autonomous driving prohibition sections with the release conditions thereof. In an example illustrated in FIG. 3, the location of an autonomous driving prohibition section "section A1" is associated with a release condition "release condition K2". The location of an autonomous driving prohibition section "section A5" is associated with a release condition "release condition K1". The location of an autonomous driving prohibition section "section B3" is associated with a release condition "release condition K4". The location of an autonomous driving prohibition section "section B7" is associated with a release condition "release condition K3". The location of an autonomous driving prohibition section "section C11" is associated with a release condition "release condition K1".

Figure 4A:
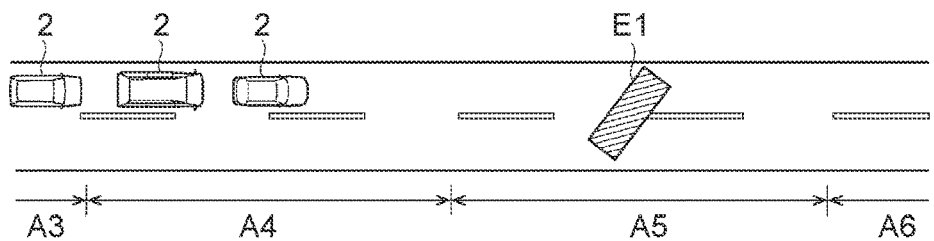
FIG. 4A is an explanatory view of an autonomous driving prohibition section.

Each release condition is associated with a reason that the autonomous driving prohibition section is set. FIGS. 4A, 4B, 4C, and 4D are explanatory views of the autonomous driving prohibition sections. In FIG. 4A, an obstacle El exists in the section A5 of a road where the vehicle 2 travels, so that the section is closed. Accordingly, at least the section A5 is set as an autonomous driving prohibition section. Under such circumstances, the vehicle 2 cannot pass through the section A5, and so the location of the vehicle 2 does not change over time. When the obstacle El is removed, the vehicle 2 can pass through the section A5. Therefore, the release condition K1 (first release condition) where a specified number or more of the vehicles 2 pass the section A5 is set for the section A5 that is an autonomous driving prohibition section (first autonomous driving prohibition section) illustrated in FIG. 4A. The release table 33A stores the section A5 in association with the release condition K1. Thus, the release condition is set based on the traveling states of the vehicles 2.

Figure 4B:
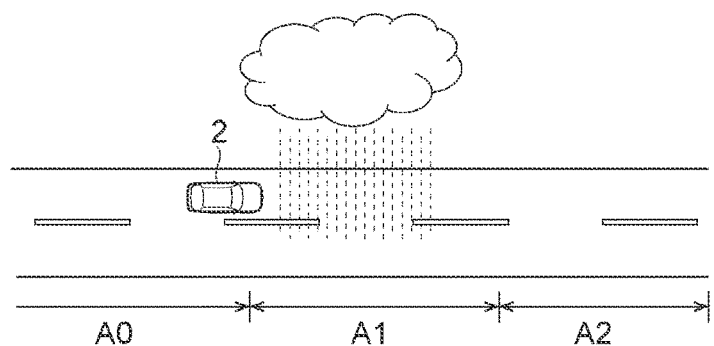
FIG. 4B is an explanatory view of an autonomous driving prohibition section.

In FIG. 4B, the section A1 of a road where the vehicle 2 travels has bad weather due to rainy weather, which hinders recognition with a sensor. Accordingly, at least the section A1 is set as an autonomous driving prohibition section. Under such circumstances, the vehicle 2 is made to travel by the driving operation of the driver, and so the location of the vehicle 2 changes. It is therefore not appropriate to set the release condition K1 (first release condition) for the section A1. The vehicle 2 activates the wiper 215 during traveling in rainy weather. Accordingly, the release condition K2 (second release condition) where the vehicle 2 passes through the autonomous driving prohibition section without activation of the wiper 215 is set for the section A1 that is an autonomous driving prohibition section (second autonomous driving prohibition section) illustrated in FIG. 4B. The release table 33A stores the section A1 in association with the release condition K2. Thus, the release condition is set based on the traveling state of the vehicle 2.

Figure 4C:
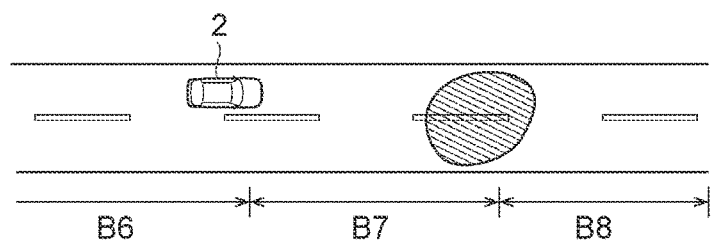
FIG. 4C is an explanatory view of an autonomous driving prohibition section.

In FIG. 4C, the section B7 of a road where the vehicle 2 travels is a low friction road due to such reasons as freezing, which hinders traveling by autonomous driving. Accordingly, at least the section B7 is set as an autonomous driving prohibition section. Under such circumstances, the location of the vehicle 2 changes with the driving operation of the driver, and so the release condition K1 (first release condition) is not appropriate. When quick braking is performed on a low friction road, the slip prevention ECU 23 operates. Accordingly, the release condition K3 (third release condition) where the vehicle passes through the autonomous driving prohibition section without activation of the slip prevention ECU 23 is set for the section B7 that is an autonomous driving prohibition section (third autonomous driving prohibition section) illustrated in FIG. 4C. The release table 33A stores the section B7 in association with the release condition K3. Thus, the release condition is set based on the traveling state of the vehicle 2.

Figure 4D:
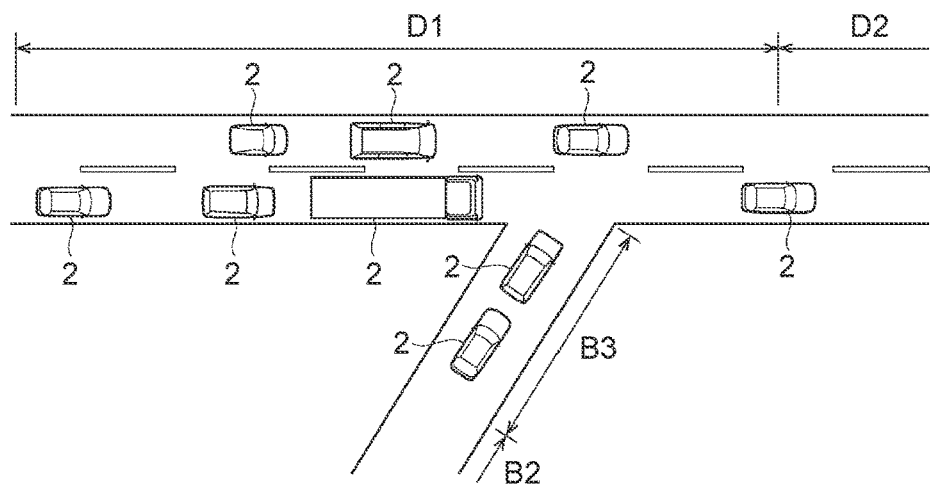
FIG. 4D is an explanatory view of an autonomous driving prohibition section.

FIG. 4D illustrates a merging scene where the vehicles 2 merge by autonomous driving. In the merging scene, the speeds of the vehicles 2 traveling in the merging destination section D1 may be larger than a speed limit of the merging destination section D1. In this case, a vehicle 2 traveling in a section B3 cannot merge with the merging destination section D1 by autonomous driving. Accordingly, at least the section B3 is set as an autonomous driving prohibition section. Meanwhile, when a difference between the speeds of the vehicles 2 traveling in the merging destination section D1 and the speed limit of the merging destination section D1 is less than a prescribed speed, the vehicle 2 in the section B3 can execute autonomous driving. Accordingly, the release condition K4 (fourth release condition) where a difference between the speeds of the vehicles 2 traveling in the merging destination section D1 connected to the autonomous driving prohibition section and the speed limit of the merging destination section D1 is less than a prescribed speed is set for the section B3 that is an autonomous driving prohibition section (fourth autonomous driving prohibition section) illustrated in FIG. 4D. The release table 33A stores the section B3 in association with the release condition K4. Thus, the release condition is set based on the traveling states of the vehicles 2.

The release determination unit 322 determines whether or not to release an autonomous driving prohibition section based on the traveling state of the vehicle 2 acquired by the acquisition unit 321 and on the location and the release condition of the autonomous driving prohibition section stored in the storage unit 33. For example, when determining release of the autonomous driving prohibition section in the "section A1" illustrated in FIG. 3, the release determination unit 322 determines whether or not to release the autonomous driving prohibition section based on the traveling state of the vehicle 2 traveling in "the section A1", and on the release condition K2.

In a more specific example, the release determination unit 322 determines release of the autonomous driving prohibition section (first autonomous driving prohibition section) which is associated with the release condition K1, when a specified number or more of the vehicles 2 pass the autonomous driving prohibition section. The release determination unit 322 determines release of the autonomous driving prohibition section (second autonomous driving prohibition section) which is associated with the release condition K2, when the vehicle 2 passes through the autonomous driving prohibition section without activation of the onboard equipment. The release determination unit 322 determines release of the autonomous driving prohibition section (third autonomous driving prohibition section) which is associated with the release condition K3, when the vehicle 2 passes through the autonomous driving prohibition section without activation of the travel system. The release determination unit 322 determines release of the autonomous driving prohibition section (fourth autonomous driving prohibition section) which is associated with the release condition K4, when a difference between speeds of the vehicles 2 traveling in a merging destination section D1 and a speed limit of the merging destination section is less than a prescribed speed.

The distribution unit 323 transmits requested data to the vehicle 2 through the communication unit 31. For example, when there is an inquiry about an autonomous driving prohibition section from the vehicle 2, the distribution unit 323 transmits the location information on the autonomous driving prohibition section to the vehicle 2 through the communication unit 31. The distribution unit 323 transmits release information to the vehicle 2, when the autonomous driving prohibition section is released. As a result, the autonomous driving prohibition section shared by the plurality of vehicles 2 is released.

The map database 34 is identical in configuration to the map database 216 of the vehicle 2. The map database 34 may be synchronized with the map database 216 of the vehicle 2 at specified intervals.

[Flowchart] FIG. 5 is a flowchart of the acquisition processing of the information processing apparatus 10. The flowchart is started at the time when an instruction to operate the information processing apparatus 10 is received.

As illustrated in FIG. 5, the acquisition unit 321 of the information processing apparatus 10 performs acquisition processing (S10) to acquire the traveling state of a vehicle 2 including the location of the vehicle 2 on the map. Next, the acquisition unit 321 performs storage processing (S12) to accumulate the traveling state of the vehicle 2 in the storage unit 33 together with acquisition time. That is the end of the flowchart. Once the flowchart is ended, the flowchart may be started at specified timing. In this case, the traveling state of the vehicle 2 is stored in chronological order.

FIG. 6 is a flowchart of the release processing of the information processing apparatus 10. The flowchart is executed at least after the flowchart illustrated in FIG. 5 is executed once and when an autonomous driving prohibition section, which is a target of release determination, is specified. The flowchart may be performed in parallel to the flowchart illustrated in FIG. 5.

As illustrated in FIG. 6, the release determination unit 322 of the information processing apparatus 10 performs release determination processing (S14) to acquire the release condition with respect to the location of an autonomous driving prohibition section as a determination target. For example, the release determination unit 322 acquires the release condition associated with the location of the autonomous driving prohibition section as a determination target with reference to the release table 33A. The release determination unit 322 then makes a determination in accordance with the release condition.

Figure 7:
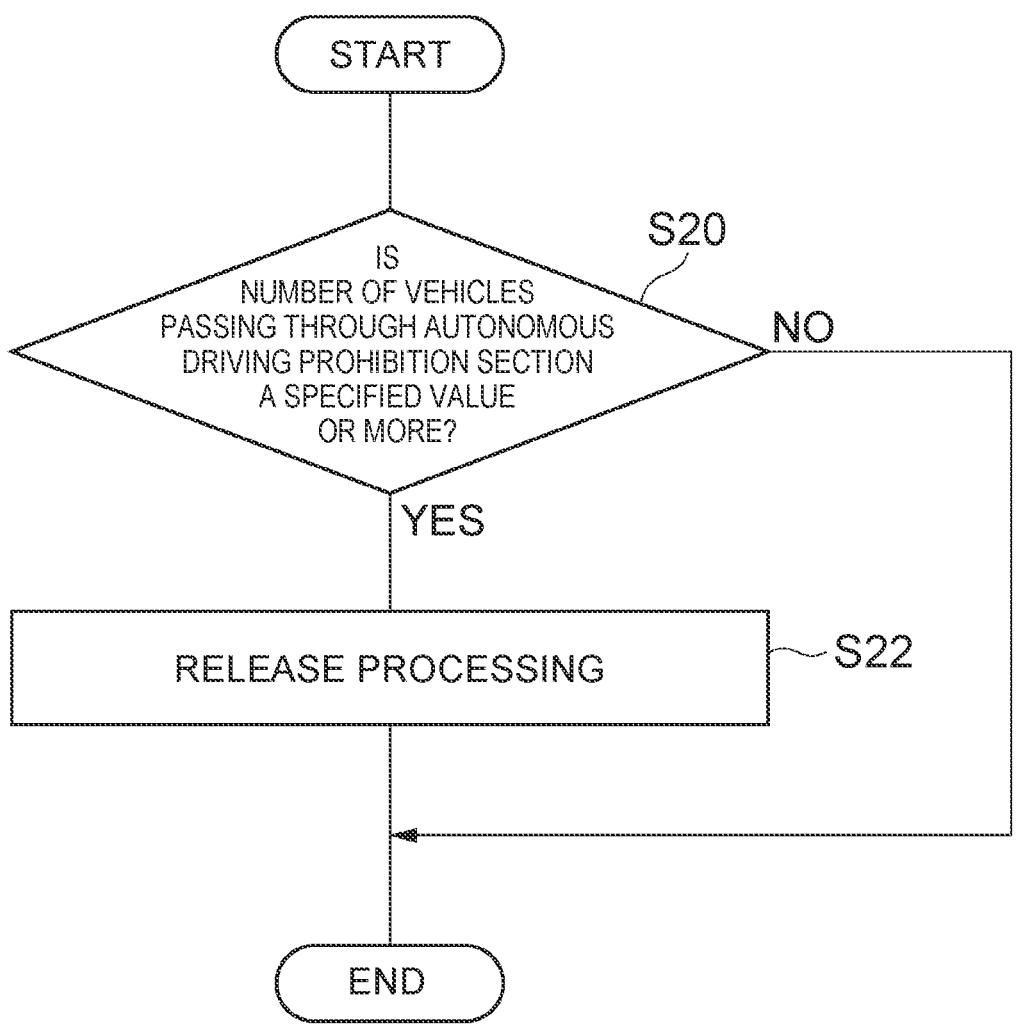
FIG. 7 is one example of a flowchart of release processing of a first autonomous driving prohibition section.

When the autonomous driving prohibition section as a determination target is associated with the release condition Kl, determination is made on the scene illustrated in FIG. 4A. In this case, the release determination unit 322 executes the flowchart illustrated in FIG. 7. As illustrated in FIG. 7, the release determination unit 322 performs determination processing (S20) to determine whether or not the number of vehicles passing through the autonomous driving prohibition section as a determination target is a specified value or more with reference to the data accumulated in the storage unit 33. When the number of vehicles passing through the autonomous driving prohibition section as a determination target is more than the specified value, the release determination unit 322 performs release processing (S22) to delete the autonomous driving prohibition section as a determination target from the storage unit 33. When the release processing (S22) is ended, or when it is determined in the determination processing (S20) that the number of vehicles passing through the autonomous driving prohibition section as a determination target is not the specified value or more, the flowchart illustrated in FIG. 7 is ended.

Figure 8:
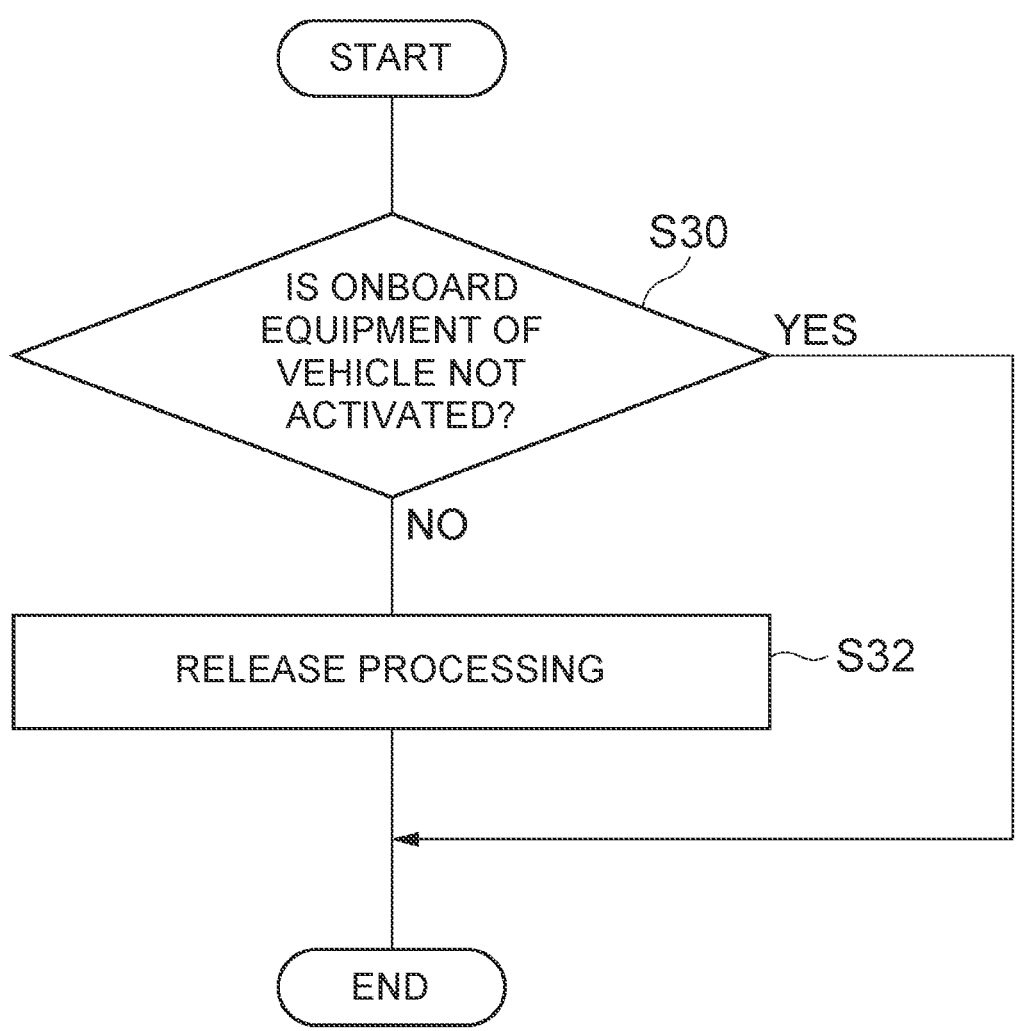
FIG. 8 is one example of a flowchart of release processing of a second autonomous driving prohibition section.

When the autonomous driving prohibition section as a determination target is associated with the release condition K2, determination is made on the scene illustrated in FIG. 4B. In this case, the release determination unit 322 executes the flowchart illustrated in FIG. 8. As illustrated in FIG. 8, the release determination unit 322 performs determination processing (S30) to determine whether or not the vehicle 2 passes through the autonomous driving prohibition section as a determination target without activation of the wiper 215 with reference to the data accumulated in the storage unit 33. When the vehicle 2 passes through the autonomous driving prohibition section as a determination target without activation of the wiper 215, the release determination unit 322 performs release processing (S32) to delete the autonomous driving prohibition section as a determination target from the storage unit 33. When the release processing (S32) is ended, or when it is determined in the determination processing (S30) that the vehicle 2 activates the wiper 215 during traveling in the autonomous driving prohibition section as a determination target, the flowchart illustrated in FIG. 8 is ended.

Figure 9:
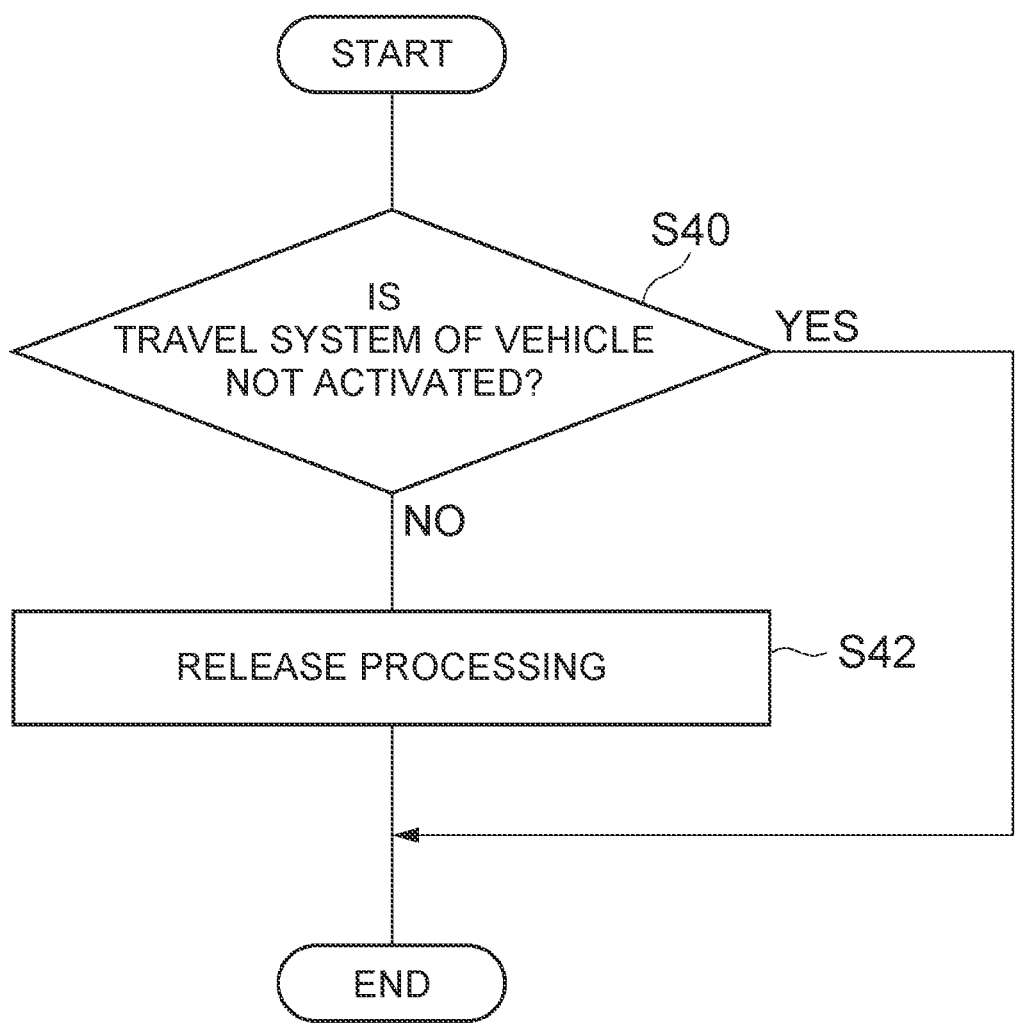
FIG. 9 is one example of a flowchart of release processing of a third autonomous driving prohibition section.

When the autonomous driving prohibition section as a determination target is associated with the release condition K3, determination is made on the scene illustrated in FIG. 4C. In this case, the release determination unit 322 executes the flowchart illustrated in FIG. 9. As illustrated in FIG. 9, the release determination unit 322 performs determination processing (S40) to determine whether or not the vehicle 2 passes through the autonomous driving prohibition section as a determination target without activation of the slip prevention ECU 23 with reference to the data accumulated in the storage unit 33. When the vehicle 2 passes through the autonomous driving prohibition section as a determination target without activation of the slip prevention ECU 23, the release determination unit 322 performs release processing (S42) to delete the autonomous driving prohibition section as a determination target from the storage unit 33. When the release processing (S42) is ended, or when it is determined in the determination processing (S40) that the vehicle 2 activates the slip prevention ECU 23 during traveling in the autonomous driving prohibition section as a determination target, the flowchart illustrated in FIG. 9 is ended.

Figure 10:
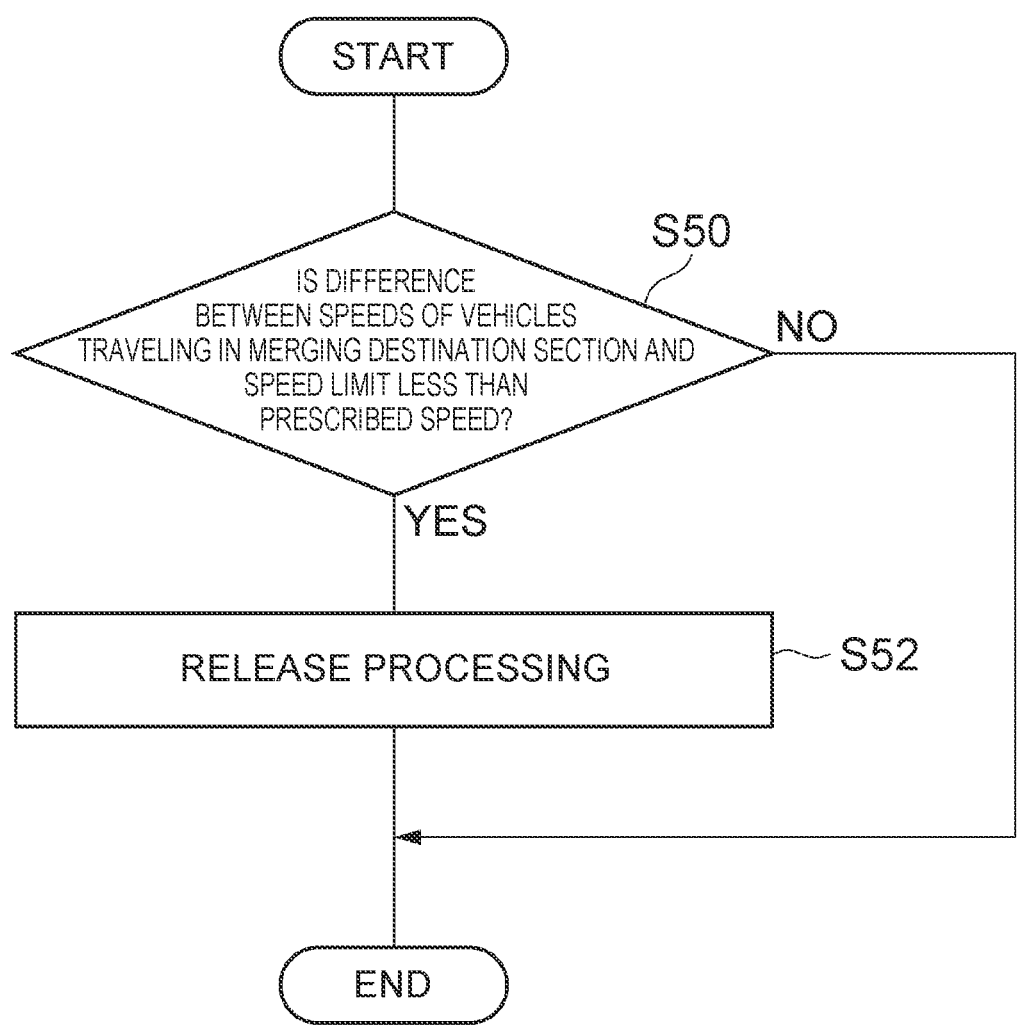
FIG. 10 is one example of a flowchart of release processing of a fourth autonomous driving prohibition section.

When the autonomous driving prohibition section as a determination target is associated with the release condition K4, determination is made on the scene illustrated in FIG. 4D. In this case, the release determination unit 322 executes the flowchart illustrated in FIG. 10. As illustrated in FIG. 10, the release determination unit 322 performs determination processing (S50) to determine, with reference to the data accumulated in the storage unit 33, whether or not a difference between speeds of the vehicles 2 traveling in the merging destination section D1 connected to the autonomous driving prohibition section as a determination target and a speed limit of the merging destination section D1 is less than a prescribed speed. When the difference between the speeds of the vehicles 2 traveling in the merging destination section D1 and the speed limit of the merging destination section D1 is less than the prescribed speed, the release determination unit 322 performs release processing (S52) to delete the autonomous driving prohibition section as a determination target from the storage unit 33. When the release processing (S52) is ended, or when it is determined in the determination processing (S50) that the difference between the speeds of the vehicles 2 traveling in the merging destination section D1 and the speed limit of the merging destination section D1 is not less than the prescribed speed, the flowchart illustrated in FIG. 10 is ended.

After the flowcharts illustrated in FIGS. 7 to 10 are ended, the processing returns to FIG. 6. The distribution unit 323 of the information processing apparatus 10 distributes the information on the autonomous driving prohibition section to the vehicle 2 (S16).

[Operational Effects of Embodiment]

In the information processing apparatus 10 according to the embodiment, the storage unit 33 stores the location of an autonomous driving prohibition section on the map in association with a release condition thereof. The release determination unit 322 determines whether or not to release the autonomous driving prohibition section based on the traveling state of the vehicle 2 and on the location and the release condition of the autonomous driving prohibition section. Thus, the information processing apparatus 10 can determine elimination of the reason why the autonomous driving prohibition section is set using the release condition set for every autonomous driving prohibition section based on the traveling state of the vehicle 2. Accordingly, the information processing apparatus 10 can release the autonomous driving prohibition section, when the reason that the autonomous driving prohibition section is set eliminated.

When the first autonomous driving prohibition section is set for the reason that the road is blocked by the existence of an obstacle or the like, the information processing apparatus 10 can determine elimination of the reason that the first autonomous driving prohibition section is set, based on the number of passing vehicles 2.

When the autonomous driving prohibition section is set for reason of the heavy rain, the information processing apparatus 10 can determine elimination of the reason that the autonomous driving prohibition section is set, based on the operating information on the onboard equipment such as a wiper and a defroster.

When the autonomous driving prohibition section is set for reason of occurrence of a slip due to freezing and the like, the information processing apparatus 10 can determine elimination of the reason that the autonomous driving prohibition section is set, based on the operating information on the travel system such as a slip prevention system.

Furthermore, when the autonomous driving prohibition section is set because of the reason that the vehicle cannot merge with a merging destination section by autonomous driving since speeds of the vehicles traveling in the merging destination section are higher than a speed limit of the merging destination section, the information processing apparatus 10 can determine elimination of the reason that the autonomous driving prohibition section is set, based on a difference between the speeds of the vehicles traveling in the merging destination section and the speed limit.

The embodiment disclosed may be carried out in modes to which various arrangements and modifications are applied based on the knowledge of those skilled in the art.

[Modification of Configuration]

The ECU may be constituted of a plurality of electronic control units. The server 3 may be constituted of a plurality of servers.

[Modification of Onboard Equipment]

The onboard equipment may be, for example, a defroster that prevents dew condensation of the windshield glass without being limited to the wiper.

[Modification of Travel System]

The travel system is not limited to the slip prevention ECU 23 disclosed in the embodiment. For example, a modified slip prevention ECU may determine a rear wheel sideslip or a front wheel sideslip based on the detection result of a yaw rate sensor, and apply a braking force to any one of four wheels in accordance with the sideslip tendency to generate stabilization moment such that the sideslip tendency is suppressed. Even with such a slip prevention ECU, the information processing apparatus can determine elimination of the reason that the autonomous driving prohibition section is set, based on the operating information of the travel system.

What is claimed is:

1. An information processing apparatus capable of communicating with a vehicle, comprising:
 a storage unit that stores a location of an autonomous driving prohibition section on a map in association with a release condition set based on a traveling state of the vehicle; and
 a control unit configured to acquire the traveling state of the vehicle including the location of the vehicle on the map from the vehicle through communication, the control unit being configured to determine whether or not to release the autonomous driving prohibition section based on the acquired traveling state of the vehicle, the location of the autonomous driving prohibition section and the release condition of the autonomous driving prohibition section, the location and the release condition being stored in the storage unit.

2. The information processing apparatus according to claim 1, wherein
the storage unit stores a location of a first autonomous driving prohibition section that is the autonomous driving prohibition section on the map in association with a first release condition as the release condition where the number of vehicles passing through the first autonomous driving prohibition section becomes a specified number or more, and
the control unit is configured to determine release of the first autonomous driving prohibition section when the number of the vehicles passing through the first autonomous driving prohibition section is the specified number or more.

3. The information processing apparatus according to claim 2, wherein
the first autonomous driving prohibition section is a section set as the autonomous driving prohibition section due to existence of an obstacle.

4. The information processing apparatus according to claim 1, wherein
the storage unit stores a location of a second autonomous driving prohibition section that is the autonomous driving prohibition section on the map in association with a second release condition as the release condition where the vehicle passes through the second autonomous driving prohibition section without activation of onboard equipment, and
the control unit is configured to acquire operating information on the onboard equipment from the vehicle as the traveling state and determine release of the second autonomous driving prohibition section when the vehicle passes through the second autonomous driving prohibition section without activation of the onboard equipment.

5. The information processing apparatus according to claim 4, wherein
the second autonomous driving prohibition section is a section set as the autonomous driving prohibition section due to rainy weather, and the onboard equipment is a wiper.

6. The information processing apparatus according to claim 1, wherein
the storage unit stores a location of a third autonomous driving prohibition section that is the autonomous driving prohibition section on the map in association with a third release condition as the release condition where the vehicle passes through the third autonomous driving prohibition section without activation of a travel system, and
the control unit is configured to acquire operating information on the travel system from the vehicle as the traveling state, and determine release of the third autonomous driving prohibition section when the vehicle passes through the third autonomous driving prohibition section without activation of the travel system.

7. The information processing apparatus according to claim 6, wherein
the third autonomous driving prohibition section is a section set as the autonomous driving prohibition section due to the section being a low friction road, and the travel system is a system for slip prevention.

8. The information processing apparatus according to claim 1, wherein
the storage unit stores a location of a fourth autonomous driving prohibition section that is the autonomous driving prohibition section on the map in association with a fourth release condition as the release condition where a difference between speed of the vehicle traveling in a merging destination section connected to the fourth autonomous driving prohibition section and a speed limit of the merging destination section is less than a prescribed speed, and
the control unit is configured to determine release of the fourth autonomous driving prohibition section when the difference between the speed of the vehicle traveling in the merging destination section and the speed limit of the merging destination section is less than the prescribed speed.

9. The information processing apparatus according to claim 8, wherein
the fourth autonomous driving prohibition section is a section having a merging point ahead of the section.

10. An information processing method comprising:
storing in a storage unit a location of an autonomous driving prohibition section on a map in association with a release condition set based on a traveling state of a vehicle;
acquiring the traveling state of the vehicle including the location of the vehicle on the map through communication from the vehicle by a control unit; and
determining whether or not to release the autonomous driving prohibition section by the control unit based on the acquired traveling state of the vehicle, the location of the autonomous driving prohibition section and the release condition of the autonomous driving prohibition section, the location and the release condition being stored in the storage unit.

11. The information processing method according to claim 10, wherein
the autonomous driving prohibition section is a first autonomous driving prohibition section set as the autonomous driving prohibition section due to existence of an obstacle,
the release condition is a first release condition where the number of vehicles passing through the first autonomous driving prohibition section becomes a specified number or more, and
the first autonomous driving prohibition section is determined to be released by the control unit when the number of the vehicles passing through the first autonomous driving prohibition section is the specified number or more.

12. The information processing method according to claim 10, wherein
the autonomous driving prohibition section is a second autonomous driving prohibition section set as the autonomous driving prohibition section due to rainy weather,
the release condition is a second release condition where the vehicle passes through the second autonomous driving prohibition section without activation of onboard equipment, and
operating information on the onboard equipment as the traveling state is acquired from the vehicle by the control unit, and the second autonomous driving prohibition section is determined to be released by the control unit when the vehicle passes through the second autonomous driving prohibition section without activation of the onboard equipment.

13. The information processing method according to claim 10, wherein the autonomous driving prohibition section is a third autonomous driving prohibition section set as the autonomous driving prohibition section due to the section being a low friction road section, the release condition is a third release condition where the vehicle passes through the third autonomous driving prohibition section without activation of a travel system, and operating information on the travel system is acquired from the vehicle by the control unit as the traveling state, and the third autonomous driving prohibition section is determined to be released by the control unit when the vehicle passes through the third autonomous driving prohibition section without activation of the travel system.

14. The information processing method according to claim 10, wherein the autonomous driving prohibition section is a fourth autonomous driving prohibition section being a section having a merging point ahead of the section, the release condition is a fourth release condition where a difference between speed of the vehicle traveling in a merging destination section connected to the fourth autonomous driving prohibition section and a speed limit of the merging destination section is less than a prescribed speed, and the fourth autonomous driving prohibition section is determined to be released by the control unit when the difference between the speed of the vehicle traveling in the merging destination section and the speed limit of the merging destination section is less than the prescribed speed.

* * * * *